's Patent [19] [11] 4,206,343
Mousel [45] Jun. 3, 1980

[54] COMBINATION LUNCH BUCKET

[76] Inventor: Canellen K. Mousel, 801 11th St., Arapahoe, Nebr. 68922

[21] Appl. No.: 941,964

[22] Filed: Sep. 13, 1978

[51] Int. Cl.² .............................................. A21B 1/52
[52] U.S. Cl. ................................... 219/387; 126/261
[58] Field of Search ............................... 219/385–387, 219/415, 433, 428–432, 436, 439, 440; 126/389, 266, 39 F, 33, 376–378, 261

[56] References Cited

U.S. PATENT DOCUMENTS

| | | | |
|---|---|---|---|
| 82,322 | 9/1868 | Jenness | 126/377 |
| 907,099 | 12/1908 | Trowbridge | 220/429 |
| 929,949 | 8/1909 | Hunt | 126/266 |
| 1,047,418 | 12/1912 | Kercher | 219/415 |
| 1,377,092 | 5/1921 | Phaneuf | 219/387 |
| 1,530,416 | 3/1925 | Saeki | 219/415 |
| 1,713,249 | 5/1929 | Abbott et al. | 219/415 |
| 2,347,670 | 5/1944 | Devine | 126/266 |
| 2,577,870 | 12/1951 | Aston | 219/387 |
| 3,805,018 | 4/1974 | Luong et al. | 219/387 |

Primary Examiner—B. A. Reynolds
Assistant Examiner—Bernard Roskoski
Attorney, Agent, or Firm—Leonard W. Suroff

[57] ABSTRACT

A receptacle device for carrying food and beverage products is disclosed having a housing with a cavity therein and a cover detachably mounted on the housing. An outer chamber is provided with mounting means for removably retaining the outer chamber within the cavity. An inner chamber is also provided, and the inner chamber is adapted to be received within the outer chamber in telescopic relation thereto for defining a fluid chamber therebetween. Alignment means for maintaining the inner chamber and the outer chamber in fixed spatial relationship to each other for defining the fluid chamber therebetween is provided as well as a plurality of open-top food storage containers adapted to be received within the inner chamber and having a removable lid associated with each one of the containers. Closure means is operatively connected to the cover for yielding urging the containers in confined relationship within the inner chamber, and the inner chamber in removably fixed relationship to the housing. A tray adapted to be electrically powered is provided with supporting means in the cavity for removably retaining the tray in a substantially horizontal plane, with the tray providing a source of heat to elevate the temperature of the liquid in the fluid chamber.

6 Claims, 8 Drawing Figures

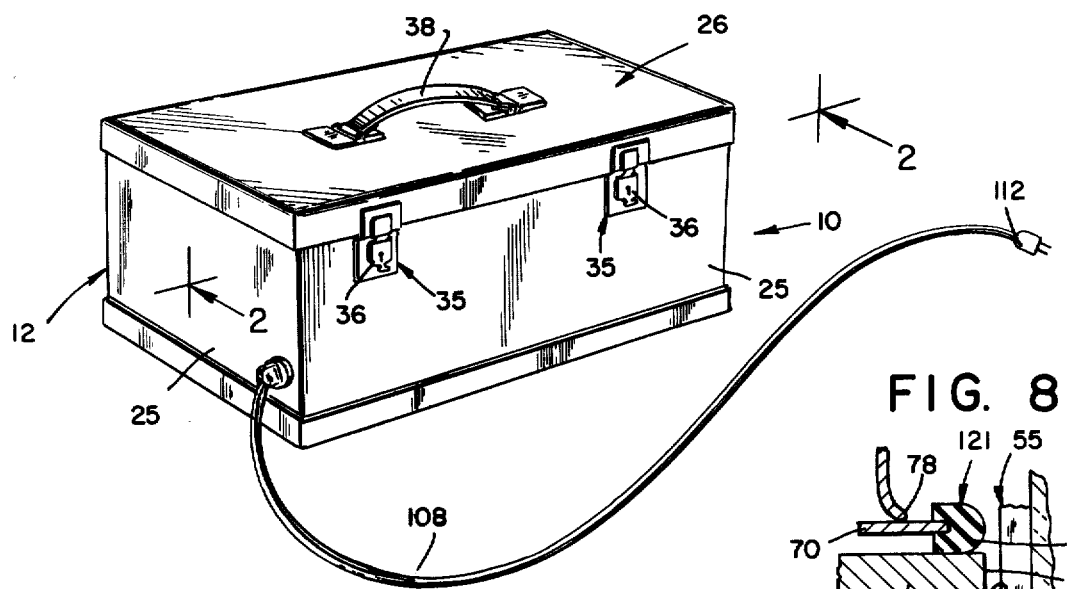
FIG. 1
FIG. 8
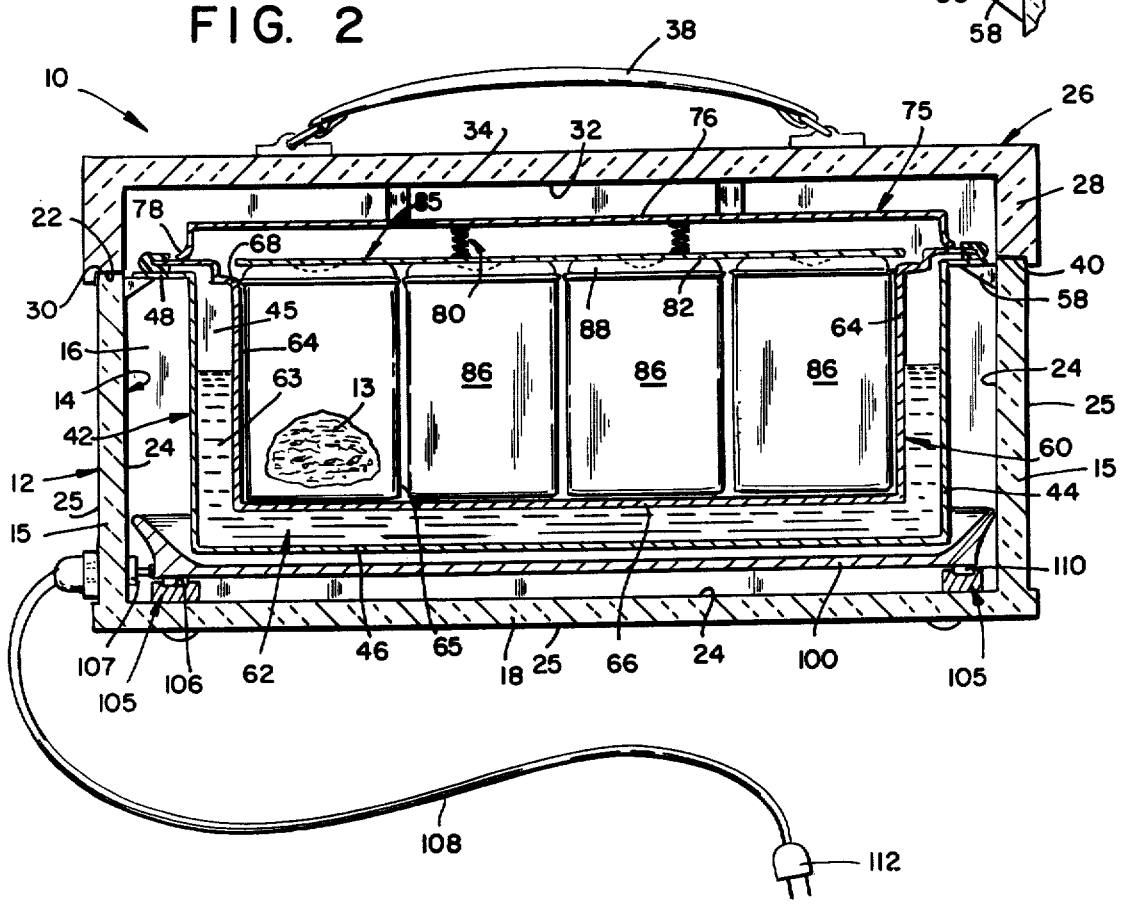
FIG. 2

COMBINATION LUNCH BUCKET

BACKGROUND OF THE INVENTION

1. Field Of The Invention

The present invention relates to an improved receptacle device for carrying food and beverage products in either a cooled state or readily heating same.

2. Description Of The Prior Art

Numerous designs have been proposed for a lunch bucket or the like for transporting of foods. As our society continues to be more mobile and the cost of eating at a restaurant increases the desire to take food with one-self on a trip increases. The problem primarily relates to the heating of food prior to being consumed.

The prior art devices are described in the patents listed below do not provide a convenient approach to the ready heating of food to an elevated temperature when desired in a simple and consistent basis. It is important for the device of the type described herein to provide an evenly distributed heat to the food in order to totally warm the food all over.

The prior art patents listed below do not in the opinion of the inventor provide a device having the novel features of the present invention.

| U.S. PAT. NO. | ISSUED |
| --- | --- |
| 2,645,332 | July 14, 1953 |
| 3,052,345 | Sept. 4, 1952 |
| 3,381,115 | April 30, 1968 |
| 3,432,025 | March 11, 1969 |
| 3,608,538 | Sept. 28, 1971 |
| 3,613,872 | Oct. 19, 1971 |
| 3,805,018 | April 16, 1974 |

OBJECTS OF THE INVENTION

It is an object of the present invention to provide a portable picnic box having various food containers which are kept in a cooled or heated condition by either the cooling action of ice cubes or dry ice or at an elevated temperature by a heating element.

It is another object of the present invention to provide a picnic box having an insulated cooling compartment containing ice cubes or dry ice and which is readily removable by the user.

Another object of the present invention is to provide an improved lunch bucket with efficient means for maintaining foods hot or cold, as may be desired, through the provision of novel heating and sealing means.

Other objects and advantages of the present invention over the prior art will become apparent as the disclosure proceeds.

SUMMARY OF THE INVENTION

A receptacle device for carrying food and beverage products is disclosed that includes a housing formed generally of a rigid insulative material and having a cavity therein with the housing being defined by connected side, end and bottom walls, including upper ends, which together form an endless upper margin defining an open top of the cavity of the housing.

A cover is detachably mounted on the housing over the upper margin to enclose the cavity. Coupling means for removably securing the cover to the housing so as to gain access to the cavity as desired is provided in addition to an outer chamber defined by connected side, end and bottom panels, including an upper edge, which together may form an endless upper outer rim.

Mounting means for removably retaining the outer chamber within the cavity is also provided to permit access to the cavity for cleaning from time to time. An inner chamber is defined by connected side, end, and bottom plates, including an upper end which together form an upper lip. The inner chamber is adapted to be received within the outer chamber in telescopic relation thereto for defining a fluid chamber intermediate the oppositely disposed spaced apart sides, ends and bottoms of the inner chamber and the outer chamber, respectively.

Alignment means for maintaining the inner chamber and the outer chamber in fixed spatial relationship to each other for defining the fluid chamber therebetween is provided for storage of a heating fluid such as water. A plurality of open-top food storage containers adapted to be received within the inner chamber and having a removable lid associated with each one of the containers is provided as part of the device. Closure means is operatively connected to the cover for yielding urging the containers in confined relationship within the inner chamber, and the inner chamber in removably fixed relationship to the housing.

The closure means includes a closure plate, and spring means extending between the cover and the closure plate so as to compress the lids on the containers. A tray adapted to be electrically powered is part of the device and supporting means in the cavity for removably retaining the tray in a substantially horizontal plane intermediate the bottom wall of the housing and the bottom panel of the outer chamber, is provided. An electrical socket is mounted on one of the walls of the housing for connection to a source of electrical energy and adapted to be connected to the tray, with the tray providing a source of heat to elevate the temperature of the liquid in the fluid chamber.

The mounting means may include a well formed with the side walls of the housing and adapted to receive the rim in seated relation thereto. Further the alignment means includes an endless upper lip adapted to engage the endless upper outer rim, and a clamping member is mounted to the cover and having an outer flange for engaging the lip and compressing same against said outer rim. The spring means may extend between the clamping means and the closure plate.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 1 is a perspective view of the receptacle device for carrying food in accordance with the present invention;

FIG. 2 is a sectional view taken on line 2—2 of FIG. 1;

FIG. 8 is an enclosed fragmentary view of the portion illustrated in FIG. 2.

DETAILED DESCRIPTION OF THE DRAWINGS

Figure 3:
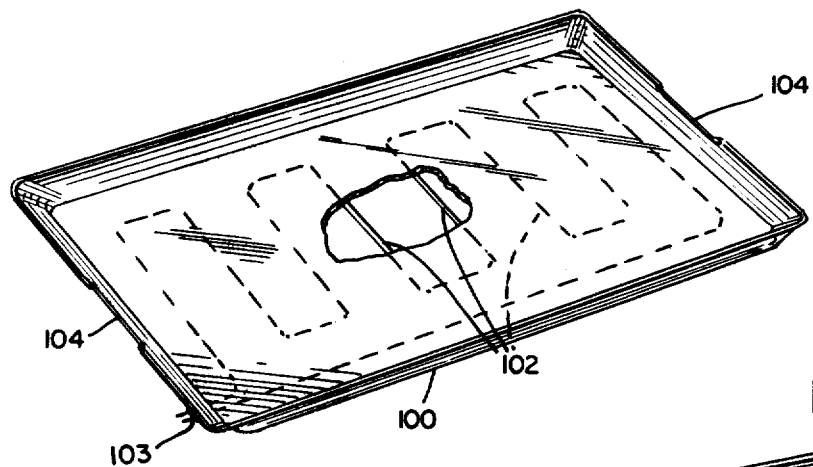
FIG. 3 is a perspective view of the individual tray for use in the device.
Figure 6:
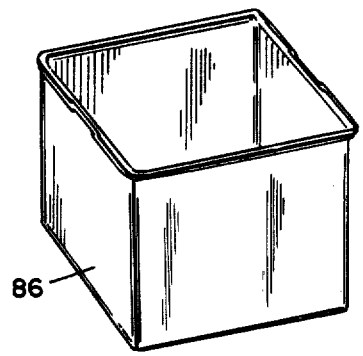
FIG. 6 is a perspective view of a storage container that may be used with the device.
Figure 4:
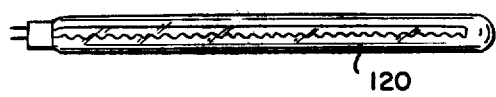
FIG. 4 is a side view of another form of heating element that may be used.
Figure 5:
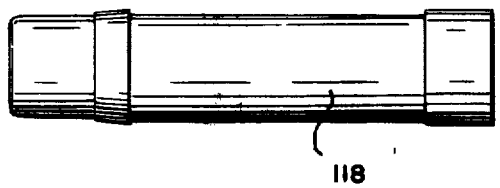
FIG. 5 is a side view of the liquid storage container that may be used within the device.

Referring to the drawings, there is illustrated in FIGS. 1 through 8 the receptacle device 10 for carrying, storage and dispensing of food and beverage products. The actual size of the device 10 may vary, as well as the particular materials from which it is fabricated. In addition, although the receptacle device 10 is illustrated as being rectangular, other shapes may also be provided.

The device 10 includes a portable carrying case or housing 12 formed generally of a rigid insulative material well known in the art and having a cavity 14 therein for receiving and storing various food products 13 that may be either retained or heated to an elevated temperature or kept cold. The housing 12 may be integrally formed and include side walls 15, end walls 16 and a bottom wall 18 that terminate in an upper end 20 which defines the upper margin 22. The upper margin 22 defines the open top of the cavity 14 of the housing 12.

The respective side walls 15 and 16 and bottom wall 18 each include an inner surface 24 and an outer surface 25. The thickness between the respective surfaces 24 and 25 may vary depending upon the insulative characteristics desired of the device 10 when used for the dispensing of hot or cold food products 13.

The cover 26 is detachably mounted to the housing 12 of the upper margin 22 to enclose the cavity 14. The cover 26 includes a downwardly extending peripheral rib 28 that terminates in a free end 30. The cover 26 may also be fabricated from an insulative material and include an inner face 32 and an outer face 34.

The cover 26 may be removably secured to the housing 12 by means of coupling means 35 so as to gain access to the cavity 14 when required. Coupling means 35 may include a conventional pair of latches 36 as well as a hinge if desired. A handle 38 may be provided for carrying the device 10 on the cover 26 on the outer face 34. To obtain the proper interfitting relationship between the housing 12 and cover 26, there may be provided a seat 40 within the free end 30 of the cover 26.

Figure 7:
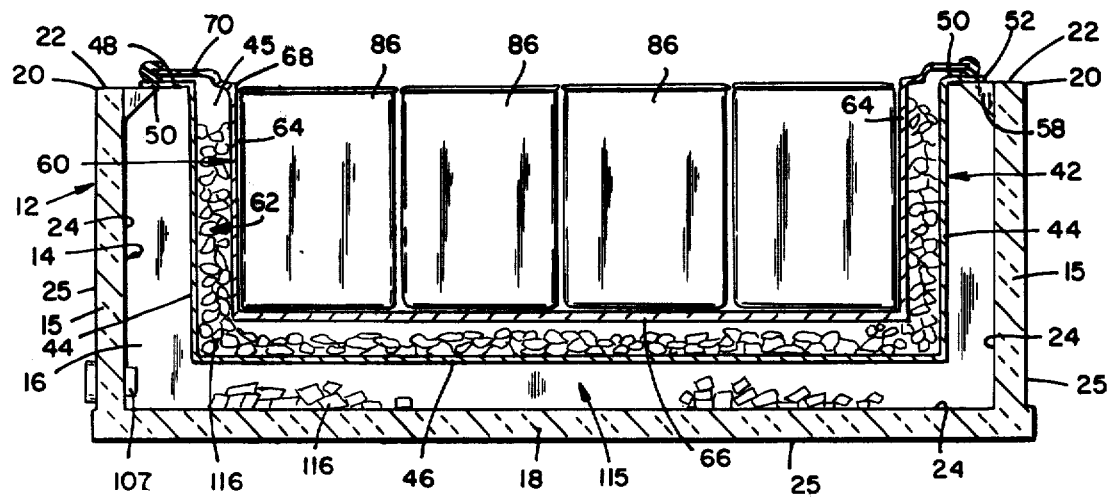
FIG. 7 is a sectional view similar to FIG. 2 illustrating the invention for the storage of food to be kept cold.

To maintain the various comestibles 13 either at an elevated or cool temperature, the device 10 has been designed to permit the utilization of electrical energy or ice, which may be dry ice, to permit the user to determine how the food is to be dispensed. For example, the user may wish to have a hot lunch one day or a cold lunch another day, and accordingly the device 10 can readily accommodate these particular needs. Accordingly the present invention permits solid food to be carried from home and warmed above room temperature immediately prior to consumption without undue inconvenience. There is provided an outer chamber 42, which may be fabricated from a metallic material, and formed from side panels 44, end panels 45 and a bottom panel 46 joined together. The side and end panels 44 and 45, respectively, terminate in an upper edge 48 which in turn form an endless or intermittent upper outer rim 50 that terminates in a distal end 52. The dimensional relationship of the outer chamber 42 relative to the cavity 14, as illustrated in FIGS. 2 and 7, is that there is space therebetween for the purpose hereinafter described.

Mounting means 55 for removably retaining the outer chamber 42 within the cavity 14 is provided and is particularly illustrated in FIG. 8. The mounting means 55 includes a well 56 formed within the side wall 15 or protrusion 58 that extends from the side wall 15. The well 56 is adapted to receive the rim 50 in seated relation thereto. This permits the ready positioning of the outer chamber 42 within the cavity 14 and during transportation of the device 10 lateral movement is avoided. The outer chamber 42 is liquid-tight for the purpose hereinafter described. The rim 50 may be intermittent to facilitate insertion and removal from within the cavity 14.

The inner chamber 60 is utilized and is adapted to be received within the outer chamber 40 in telescopic relation thereto for defining a fluid chamber 62 therebetween. The inner chamber 60 includes side plates 64, end plate 65 and bottom plate 66 joined together. The side and end plates 64 and 65, respectively, include an upper end 68, which together form an endless or intermittent upper peripheral lip 70.

The horizontally disposed spaced apart sides 44 and 64, ends 45 and 65, and bottoms 46 and 66 of the outer chamber 40 and the inner chamber 60, respectively, define the fluid chamber 62 which includes a fluid 63 therein. The fluid 63 may be water or something else that readily boils or can be maintained at an elevated temperature for heating of the food items 13.

Considering that the device 10 may be transported with the fluid 63 contained therein, it has been found desirable to further provide alignment means 75 for maintaining the chambers 40 and 60 in the required fixed spatial relationship to each other for defining the fluid chamber 62. The alignment means 75 may include the upper lip 70 which is adapted to engage the endless upper outer rim 50 and a clamping member 76 mounted to the cover 26 and having an outer flange 78 for engaging the lip 70 and compressing same against the rim 50. To obtain the resiliency, spring means 80 may be provided that extend between the clamping member 76 and the closure plate 82.

Closure means 85 is provided and operatively connected to the cover 26 for retaining containers 86 in confined relationship within the inner chamber 60. The closure means 85 includes plate 82 and the spring means 80 extending between the cover 26 and the closure plate 82 so as to compress the lids 88 on the container 86.

A tray 100, as illustrated in FIG. 3, may include heating coils 102 therein and have an electrical socket 103 at one end thereof. A handle recess 104 may be utilized at each end of the tray 100. Supporting means 105 is provided in the cavity 14 for removably retaining the tray 100 in a substantially horizontal plane intermediate the bottom wall 18 of the housing 12 and the bottom panel 46 of the outer chamber 40. The supporting means 105 may include a plurality pockets or sockets 106 adapted to receive the legs 110 of the tray 100 as illustrated in FIG. 2 in mating relationship.

An electrical socket 107 is mounted on one of the walls 15 and 16 of the housing 12 for connection to a conventional source, or battery source, of electrical energy and adapted to be connected to the tray 100 by means of electric cord 108. The tray 100 provides for a source of heat to elevate the temperature of the liquid 63 in the fluid chamber 62.

The electric cord 108 is used to couple the tray 100 to the source of electrical energy. Since the tray 100 is removable because of the supporting means 105 that is provided, it is possible to use the tray individually if desired. The tray 100 has its legs 110 that are adapted to snap into the mating sockets 107, as illustrated in FIG. 2. The tray 100 is removable when the containers 86 are removed from the housing 12.

The sides 44 and 64, ends 45 and 65, and bottoms 46 and 66 of chambers 40 and 60, respectively, may be in parallel spaced relationship, or equidistant, to each other so that the liquid 63 is of the same thickness or width. The provides for equal heat distribution over the areas of the containers 86.

Due to the fact that the fluid 63 is maintained within the fluid chamber 62, the tray 100 emanates heat and therefore raises the temperature of the fluid 63, which in turn maintains the comestibles 13 at a desired temperature. The fluid 63 transfers the heat to the containers which may be of a heat conductive material such as aluminum. In this manner the user may plug in the electric cord 108, say one-half hour before lunch time, supper time, or any other time, and have the food at the desired temperature level when ready to be eaten. It is appreciated that the plug 112 may be of the type that is adapted to be used within a motor vehicle in a lighter, such that the device 10 may be used on a picnic, during vacations, etc.

The novelty of the invention is further enhanced in that the fluid chamber 62 and the space between the bottom 18 of the housing 12 and the bottom 46 of the outer chamber 40 which acts as a storage chamber 115, may be filled with ice 116 if a cold food is desired. In addition, a thermos 118 may be stored in the storage chamber 115. The socket 107 may use a bulb 120 therein to provide for a low level of heat inside of the cavity 14.

The above described device 10 provides for a novel food receptacle device which includes a fluid chamber 62 such that the overall surfaces of each container 86 may be individually elevated in temperature at a gradual level, during which time the temperature of the food 13 may concurrently be heated. The fluid 63 provides for a convenient method of heat transmission in order to obtain the desired warming of the food 13 and yet permit ready transportation of the device 10 from the home to the desired location of use.

The length of time that the electrical energy is to be supplied to the device 10 will vary depending upon the type of food 13 in the containers 86. In addition, the size and the number of containers 86 will also influence this fact. The level of fluid 63 may vary, but the clamping member 76 illustrated provides for the desired sealing of the fluid 63 within the fluid chamber 62 during transportion thereof and sealing means 121 is provided in the form of a rubber or plastic gasket 122 may be provided as illustrated in FIG. 8 to maintain a liquid tight seal. At the same time the device 10 may be readily disassembled for cleaning and other purposes. One such purpose being the conversion from a hot device to a cold food storage device, as illustrated in FIG. 7.

Although an illustrative embodiment of the invention has been described in detain herein with reference to the accompanying drawings, it is to be understood that the invention is not limited to the precise embodiment and that various changes and modifications may be effected therein without departing from the scope or spirit of the invention.

I claim:
1. A receptacle device for carrying food and beverage products, comprising:
   A. a housing formed generally of a rigid insulative material and having a cavity therein,
   B. said housing being defined by connected side, end and bottom walls, including upper ends, which together form an endless upper margin defining an open top of said cavity of said housing,
   C. a cover detachably mounted on said housing over said upper margin to enclose said cavity,
   D. coupling means for removably securing said cover to said housing so as to gain access to said cavity as desired,
   E. an outer chamber defined by connected side, end and bottom panels, including an upper edge having a rim extending outwardly therefrom,
   F. mounting means for removably retaining said outer chamber within said cavity,
   G. an inner chamber defined by connected side, end, and bottom plates, including an upper end and an upper lip,
   H. said inner chamber received within said outer chamber in telescopic relation thereto for defining a fluid chamber intermediate said oppositely disposed spaced apart sides, ends and bottoms of said inner chamber and said outer chamber, respectively, with said upper lip adapted to extend in overlapping relationship to said rim,
   I. alignment means for maintaining said inner chamber and said outer chamber in fixed spatial relationship to each other for defining said fluid chamber therebetween,
   J. a plurality of open-top food storage containers adapted to be received within said inner chamber and having a removable lid associated with each one of said containers,
   K. closure means operatively connected to said cover for yieldably urging said containers in confined relationship within said inner chamber, and said inner chamber being in removably fixed relationship to said housing,
   L. said closure means including:
      (1) a closure plate, and
      (2) spring means extending between said cover and said closure plate such that said closure plate is maintained in a horizontal plane so as to compress said lids on said containers when said cover is positioned on said housing,
   M. an electrically heated tray having resistive element,
   N. supporting means in said cavity for removably retaining said tray in a substantially horizontal plane intermediate said bottom wall of said housing and said bottom panel of said outer chamber so as to prevent lateral movement thereof,
   O. an electrical socket mounted on one of said walls of said housing for connection to a source of electrical energy and for connection to said tray, said tray providing a source of heat to elevate the temperature of the liquid in said fluid chamber,
   P. said alignment means includes:
      (1) a clamping member mounted to said cover and having an outer flange for engaging said upper lip and compressing same towards said rim, and

(2) said spring means extends between said clamping member and said closure plate, Q. sealing means extending between said rim and said upper lip to maintain said fluid chamber liquid tight, and R. said supporting means includes:
  (1) a plurality of legs on said tray, and
  (2) a plurality of pockets contained on said bottom wall in aligned relationship to said legs such that mating therebetween is obtained so as to prevent the lateral movement therebetween.

2. A receptacle device in accordance with claim 1, wherein said rim extends continuously from said outer chamber.

3. A receptacle device in accordance with claim 1, wherein said mounting means includes a well formed with said side walls of said housing and adapted to receive said rim in seated relation thereto.

4. A receptacle device in accordance with claim 3, wherein a plurality of projections are provided each containing said well therein.

5. A receptacle device in accordance with claim 3, wherein said alignment means includes said well adapted to receive said upper lip therein.

6. A receptacle device in accordance with claim 5, wherein said upper lip is continuous.

* * * * *